United States Patent
Akavaram et al.

(10) Patent No.: US 12,430,199 B2
(45) Date of Patent: Sep. 30, 2025

(54) FLOW CONTROL BETWEEN PERIPHERAL COMPONENT INTERCONNECT EXPRESS DEVICES

(71) Applicant: QUALCOMM Incorporated, San Diego, CA (US)

(72) Inventors: Santhosh Reddy Akavaram, Hyderabad (IN); Prakhar Srivastava, Lucknow (IN); Sai Sreeja Mukka, Hyderabad (IN); Yogananda Rao Chillariga, Hyderabad (IN); Ravindranath Doddi, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 321 days.

(21) Appl. No.: 17/976,468

(22) Filed: Oct. 28, 2022

(65) Prior Publication Data

US 2024/0143434 A1   May 2, 2024

(51) Int. Cl.
  *G06F 11/07* (2006.01)
  *G06F 13/40* (2006.01)
(52) U.S. Cl.
  CPC ...... *G06F 11/0793* (2013.01); *G06F 11/0745* (2013.01); *G06F 13/4059* (2013.01); *G06F 2213/0026* (2013.01)
(58) Field of Classification Search
  CPC ............ G06F 11/0793; G06F 11/0745; G06F 13/4059; G06F 13/4221; G06F 13/4282
  See application file for complete search history.

(56) References Cited

U.S. PATENT DOCUMENTS

| | | | |
|---|---|---|---|
| 2009/0086735 A1* | 4/2009 | Tsang | H04L 1/1874 370/394 |
| 2013/0028088 A1* | 1/2013 | Do | H04L 1/1607 370/235 |
| 2015/0103668 A1* | 4/2015 | Tian | H04L 49/90 370/236 |
| 2020/0145725 A1* | 5/2020 | Eberle | H04N 21/2387 |
| 2020/0153593 A1 | 5/2020 | Benjamini et al. | |
| 2021/0056058 A1 | 2/2021 | Lee et al. | |
| 2022/0318166 A1 | 10/2022 | Choi | |
| 2023/0058854 A1* | 2/2023 | Erler | G06F 11/1004 |
| 2023/0171024 A1* | 6/2023 | Sun | H04L 1/1671 714/776 |

OTHER PUBLICATIONS

PCI Express: "PCI Express Base Specification Revision 6.0", 6.0-1.0-PUB, Dec. 16, 2021, 50 pages, Sections 3.6.2, 3.6.2.1, 3.6.2.2, Figure 3-20, Figure 3-21.
International Search Report and Written Opinion—PCT/US2023/074084—ISA/EPO—Dec. 1, 2023.

* cited by examiner

*Primary Examiner* — Phong H Dang
(74) *Attorney, Agent, or Firm* — Loza & Loza, LLP

(57) ABSTRACT

Aspects of the disclosure provide techniques for retransmitting transaction layer packets (TLPs) for which a negative acknowledgment (NACK) is received without retransmitting previously transmitted TLPs that are correctly received, yet out-of-sequence, by a receiver. A receiver (e.g., a receiving link partner) can provide a transmitter (e.g., a transmitting link partner) with a NACK that includes a starting sequence number (SSN) and an ending sequence number (ESN), which can notify the transmitter about the packets for retransmission and/or packets that can be purged from a transmit buffer of the transmitter.

22 Claims, 10 Drawing Sheets

FLOW CONTROL BETWEEN PERIPHERAL COMPONENT INTERCONNECT EXPRESS DEVICES

TECHNICAL FIELD

The technology discussed below relates generally to peripheral component interconnect express (PCIe) devices, and more particularly, to techniques for flow control of communication between PCIe devices.

INTRODUCTION

High-speed interfaces are frequently used between circuits and components of mobile wireless devices and other complex systems. For example, certain devices may include processing, communications, storage, and/or display devices that interact with one another through one or more high-speed interfaces. Some of these devices, including synchronous dynamic random-access memory (SDRAM), may be capable of providing or consuming data and control information at processor clock rates. Other devices, e.g., display controllers, may use variable amounts of data at relatively low video refresh rates.

The peripheral component interconnect express (PCIe) standard is a high-speed interface that supports a high-speed data link capable of transmitting data at multiple gigabits per second. The PCIe interface also has multiple standby modes for when a link is inactive. PCIe can provide lower latency and higher data transfer rates compared to parallel buses. PCIe can be used for communication between a wide range of different devices. Typically, one device, e.g., a processor or hub, acts as a host, that communicates with multiple devices, referred to as endpoints, through PCIe links (data links). The peripheral devices or components may include graphics adapter cards, network interface cards (NICs), storage accelerator devices, mass storage devices, Input/Output (I/O) interfaces, and other high-performance peripherals.

Flow control between PCIe devices can be handled at a transaction layer that performs flow control of transaction layer packets (TLPs). PCIe communication involves the transmission and reception of TLPs between PCIe devices. A data link layer applies a sequence number to each TLP to facilitate flow control and correct ordering of received TLPs. A receiver can retransmit a TLP that is corrupted or missing based on the sequence numbers of received TLPs.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example an apparatus having an interface circuit and a controller is disclosed for a wired data link (e.g., a peripheral component interconnect express (PCIe) link) connected with a link partner. The apparatus includes an interface circuit configured to provide an interface with the wired data link and a controller. The controller is configured to transmit, to the link partner, one or more first data packets via the wired data link. The controller is further configured to receive a negative feedback comprising a first parameter and a second parameter that are configured to request retransmission of one or more of the first data packets. The controller is further configured to retransmit the requested one or more first data packets.

In one example an apparatus having an interface circuit and a controller is disclosed for a wired data link (e.g., a PCIe link) connected with a link partner. The apparatus includes an interface circuit configured to provide an interface with the wired data link and a controller. The controller is configured to receive, from the link partner, one or more first data packets via the wired data link, the one or more first data packets included in an anticipated sequence of data packets. The controller is further configured to transmit a negative feedback comprising a first parameter and a second parameter that are configured to request retransmission of one or more second data packets that are included in the anticipated sequence of data packets, at least one of the second data packets having a sequence number earlier in time than respective sequence numbers of the one or more first data packets. The controller is further configured to receive retransmissions of the one or more second data packets.

In one example, a method of operating an apparatus for data communication is disclosed. The method includes transmitting, to a link partner, one or more first data packets via a wired data link. The method further includes receiving a negative feedback comprising a first parameter and a second parameter that are configured to request retransmission of one or more of the first data packets. The method further includes retransmitting the requested one or more first data packets.

In one example, a method of operating an apparatus for data communication is provided. The method includes receiving, from a link partner, one or more first data packets via a wired data link, the one or more first data packets included in an anticipated sequence of data packets. The method further includes transmitting a negative feedback comprising a first parameter and a second parameter that are configured to request retransmission of one or more second data packets that are included in the anticipated sequence of data packets, at least one of the second data packets having a sequence number earlier in time than respective sequence numbers of the one or more first data packets. The method further includes receiving retransmissions of the one or more second data packets.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

Aspects of the disclosure provide techniques for retransmitting TLPs for which a negative acknowledgment (NACK) is received without retransmitting previously transmitted TLPs that are correctly received, yet out-of-sequence, by a receiver. In some aspects, the receiver (e.g., a receiving link partner) can provide a transmitter (e.g., a transmitting link partner) with a NACK that includes a starting sequence number (SSN) and an ending sequence number (ESN), which can notify the transmitter about the packets for retransmission and/or packets that can be purged from a transmit buffer of the transmitter.

Figure 1:
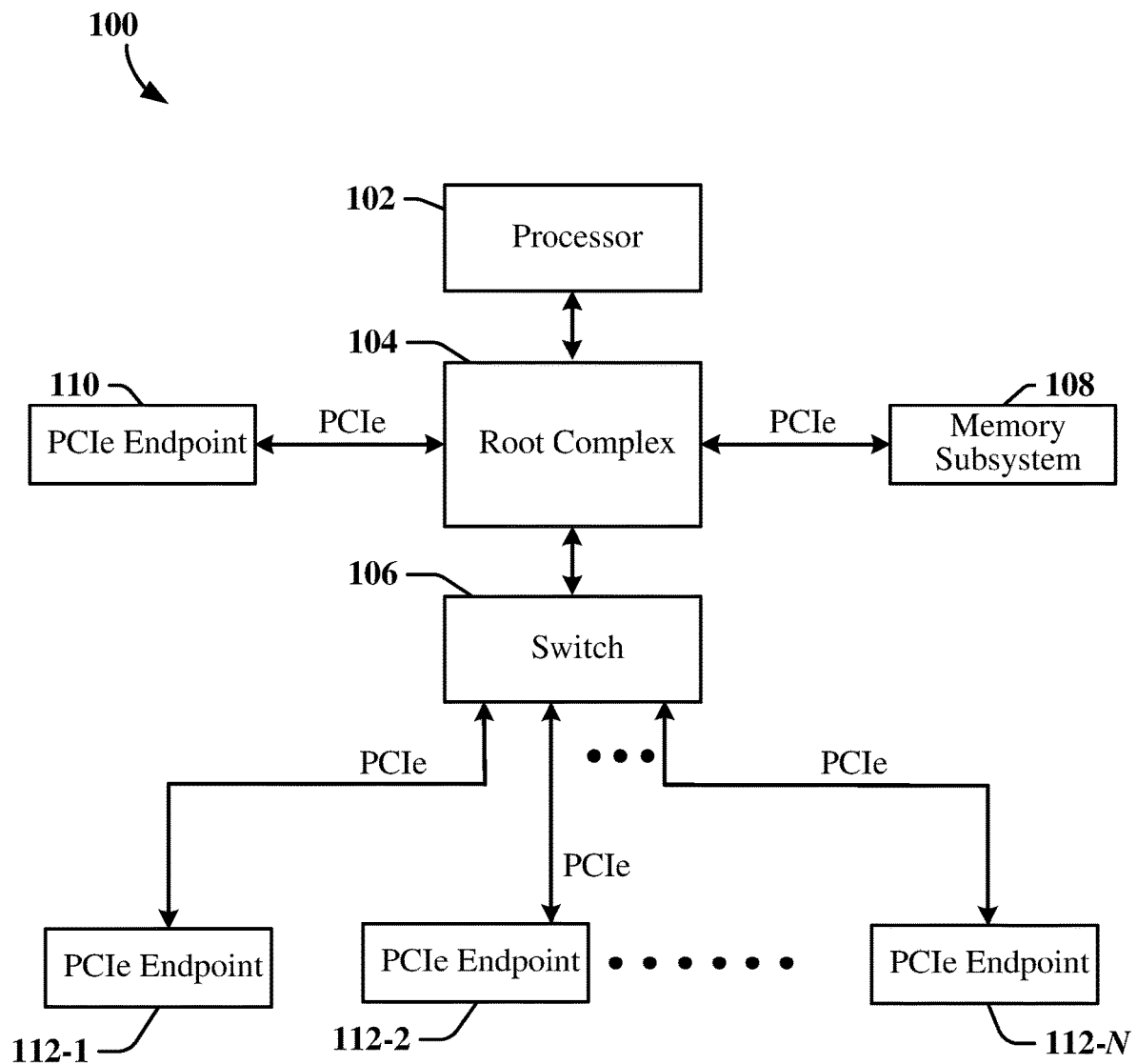
FIG. 1 is a block diagram of a computing architecture with peripheral component interconnect express (PCIe) interfaces suitable for aspects of the present disclosure.

FIG. 1 is a block diagram of an exemplary computing architecture using PCIe interfaces. The computing architecture 100 operates using multiple high-speed PCIe interface serial links. A PCIe interface may be characterized as an apparatus comprising a point-to-point topology, where separate serial links connect each device to a host, which can be referred to as a root complex 104. In the computing architecture 100, the root complex 104 couples a processor 102 to memory devices, e.g., the memory subsystem 108, and a PCIe switch circuit 106. In some instances, the PCIe switch circuit 106 includes cascaded switch devices. One or more PCIe endpoint devices 110 may be coupled directly to the root complex 104, while other PCIe endpoint devices 112-1, 112-2, . . . 112-N may be coupled to the root complex 104 through the PCIe switch circuit 106. The root complex 104 may be coupled to the processor 102 using a proprietary local bus interface or a standards defined local bus interface. The root complex 104 may control configuration and data transactions through the PCIe interfaces and may generate transaction requests for the processor 102. In some examples, the root complex 104 is implemented in the same Integrated Circuit (IC) device that includes the processor 102. The root complex 104 can support multiple PCIe ports.

The root complex 104 may control communication between the processor 102 and the memory subsystem 108 which is one example of an endpoint. The root complex 104 (host) also controls communication between the processor 102 and other PCIe endpoint devices 110, 112-1, 112-2, . . . 112-N. The PCIe interface may support full-duplex communication between any two endpoints, with no inherent limitation on concurrent access across multiple endpoints. Data packets may carry information through any PCIe link. In a multi-lane PCIe link, packet data may be striped across multiple lanes. The number of lanes in the multi-lane link may be negotiated during device initialization and may be different for different endpoints.

When one or both traffic directions of the lanes of the PCIe links are being underutilized by low bandwidth applications that could be adequately served by fewer lanes, then the root complex 104 and endpoint may operate the link with more or fewer transmit lines and receive lines in one or both directions. In some aspects, a transmitter (e.g., root complex 104) can transmit TLPs to a receiver (e.g., a PCIe endpoint 110) using flow control techniques that can reduce the retransmission of TLPs.

In some aspects, the computing architecture 100 may be implemented based on the PCIe M.2 Specification. The M.2 form factor can be used for mobile adapters. The M.2 enables expansion, contraction, and higher integration of functions onto a single form factor module solution. For example, any of the PCIe endpoints described above relation to FIG. 1 can be implemented as an M.2 adapter, and the root complex 104 can be implemented as an M.2 platform.

Figure 2:
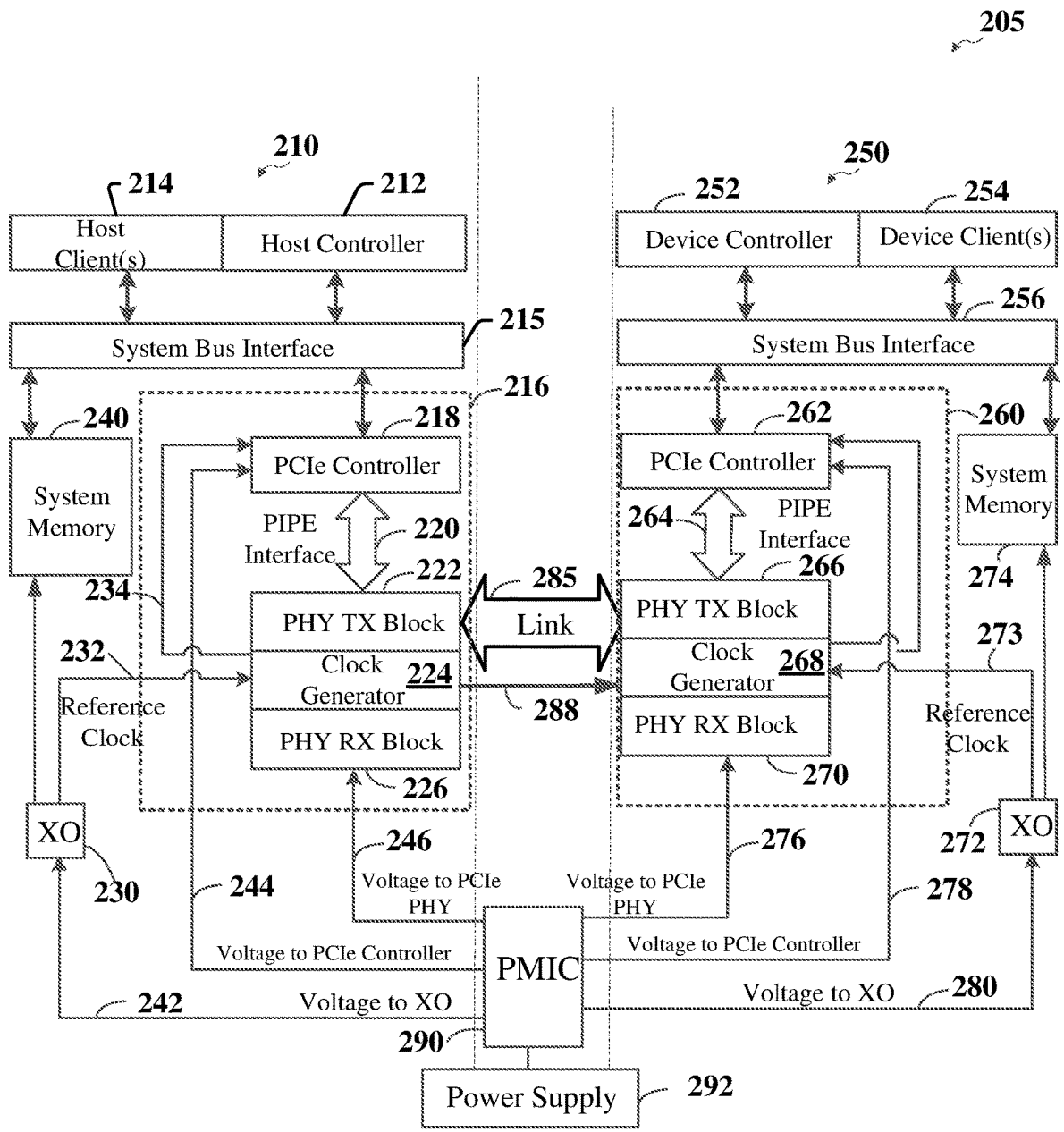
FIG. 2 is a block diagram of a system including a host system and an endpoint device system according to aspects of the present disclosure.

FIG. 2 is a block diagram of an exemplary PCIe system in which aspects of the present disclosure may be implemented. The system 205 includes a host system 210 and an endpoint device system 250, which may be the same as the host and endpoints of FIG. 1. For example, the host system 210 may be a PCIe M.2 platform, and the endpoint device system 250 may be an M.2 adapter. The host system 210 may be integrated on a first chip (e.g., system on a chip or SoC), and the endpoint device system 250 may be integrated on a second chip. Alternatively, the host system and/or endpoint device system may be integrated in first and second packages, e.g., SiP, first and second system boards with multiple chips, or in other hardware or any combination. In this example, the host system 210 and the endpoint device system 250 are coupled by a PCIe link 285.

The host system 210 includes one or more host clients 214. Each of the one or more host clients 214 may be implemented on a processor executing software that performs the functions of the host clients 214 discussed herein. For the example of more than one host client, the host clients may be implemented on the same processor or different processors. The host system 210 also includes a host controller 212, which may perform root complex functions. The host controller 212 may be implemented on a processor executing software that performs the functions of the host controller 212 discussed herein.

The host system 210 includes a PCIe interface circuit 216, a system bus interface 215, and a host system memory 240. The system bus interface 215 may interface the one or more host clients 214 with the host controller 212, and interface each of the one or more host clients 214 and the host controller 212 with the PCIe interface circuit 216 and the host system memory 240. The PCIe interface circuit 216 provides the host system 210 with an interface to the PCIe link 285. In this regard, the PCIe interface circuit 216 is configured to transmit data (e.g., from the host clients 214) to the endpoint device system 250 over the PCIe link 285 and receive data from the endpoint device system 250 via the PCIe link 285. The PCIe interface circuit 216 includes a PCIe controller 218, a physical interface for PCI Express (PIPE) interface 220, a physical (PHY) transmit (TX) block 222, a clock generator 224, and a PHY receive (RX) block 226. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and flow control functions (e.g., flow control based on PCIe specification), as described further below. The flow control functions can selectively retransmit (replay) only packets (TLPs) for which NACK is received (i.e., lost or corrupted during transmission), instead of replaying all the packets present in a replay buffer of the transmitter. For example, the replay buffer may be implemented using the system memory 240/260 and/or included in the PHY TX block 222/266.

The host system 210 also includes an oscillator (e.g., crystal oscillator or "XO") 230 configured to generate a reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232. In this regard, the clock generator 224 may include a phase locked loop (PLL) or multiple PLLs, in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. The device controller 252 may be configured to receive bandwidth request(s) from one or more device clients, and determine whether to change the number of transmit lines or the number of receive lines based on bandwidth requests. The device controller 252 may be implemented on a processor executing software that performs the functions of the device controller.

The endpoint device system 250 includes a PCIe interface circuit 260, a system bus interface 256, and endpoint system memory 274. The system bus interface 256 may interface the one or more device clients 254 with the device controller 252, and interface each of the one or more device clients 254 and device controllers 252 with the PCIe interface circuit 260 and the endpoint system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as the host device) over the PCIe link 285 and receive data from the host system 210 via the PCIe link 285. The PCIe interface circuit 260 includes a PCIe controller 262, a PIPE interface 264, a PHY TX block 266, a PHY RX block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer, and control flow functions.

The host system memory 240 and the endpoint system memory 274 at the endpoint may be configured to contain registers for the status of each transmit line and receive line of the PCIe link 285. The transmit lines may be configured as differential transmit line pairs and the receive lines may be configured as differential receive line pairs.

The endpoint device system 250 also includes an oscillator (e.g., crystal oscillator) 272 configured to generate a stable reference clock signal 273 for the endpoint system memory 274 and the clock generator 268. In the example in FIG. 2, the clock generator 224 at the host system 210 is configured to generate a stable reference clock signal, which is forwarded to the endpoint device system 250 via a differential clock line 288 by the PHY RX block 226. At the endpoint device system 250, the PHY RX block 270 receives the endpoint (EP) reference clock signal on the differential clock line 288, and forwards the EP reference clock signal to the clock generator 268. The EP reference clock signal may have a frequency of 100 MHz, but is not limited to such frequency. The clock generator 268 can be configured to generate multiple clock signals based on the EP reference clock signal from the differential clock line 288, as discussed further below. In this regard, the clock generator 268 may include multiple phase-locked loops (PLLs), in which each PLL generates a respective one of the multiple clock signals by multiplying up the frequency of the EP reference clock signal.

The system 205 also includes a power management integrated circuit (PMIC) 290 coupled to a power supply 292 e.g., mains voltage, a battery, or other power source. The PMIC 290 is configured to convert the voltage of the power supply 292 into multiple supply voltages (e.g., using switch regulators, linear regulators, or any combination thereof). In this example, the PMIC 290 generates voltages 242 for the oscillator 230, voltages 244 for the PCIe controller 218, and voltages 246 for the PHY TX block 222, the PHY RX block 226, and the clock generator 224. The voltages 242, 244, and 246 may be programmable, in which the PMIC 290 is configured to set the voltage levels (corners) of the voltages 242, 244, and 246 according to instructions (e.g., from the host controller 212).

The PMIC 290 also generates a voltage 280 for the oscillator 272, a voltage 278 for the PCIe controller 262, and a voltage 276 for the PHY TX block 266, the PHY RX block 270, and the clock generator 268. The voltages 280, 278, and 276 may be programmable, in which the PMIC 290 is configured to set the voltage levels (corners) of the voltages 280, 278, and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244, and 246 and a second PMIC for generating voltages 280, 278, and 276. In this example, the first and second PMICs may both be coupled to the same power supply 292 or to different power supplies.

In operation, the PCIe interface circuit 216 on the host system 210 may transmit data from the one or more host clients 214 to the endpoint device system 250 via the PCIe link 285. The data from the one or more host clients 214 may be directed to the PCIe interface circuit 216 according to a PCIe map set up by the host controller 212 during initial configuration, sometimes referred to as Link Initialization, when the host controller negotiates bandwidth for the link. At the PCIe interface circuit 216, the PCIe controller 218 may perform transaction layer and data link layer functions on the data e.g., packetizing the data, generating error correction codes to be transmitted with the data, etc.

The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a clock 234 for an appropriate data rate or transfer rate based on the reference clock signal 232, and input the clock 234 to the PCIe controller 218 to time operations of the PCIe controller 218. In this example, the PIPE interface 220 may include a 22-bit parallel bus that transfers 22-bits of data to the PHY TX block in parallel for each cycle of the clock 234. At 250 MHz this translates to a transfer rate of approximately 8 GT/s.

The PHY TX block 222 serializes the parallel data from the PCIe controller 218 and drives the PCIe link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the PCIe link 285, and deserializes the received data into parallel data. In this regard, the PHY RX block 270 may include one or more receivers and one or more deserializers. The clock generator 268 may generate a high-frequency clock for the one or more deserializers based on the EP reference clock signal. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system memory 240 via the PCIe link 285. In this regard, the PCIe controller 262 at the PCIe interface circuit 260 may perform transaction layer and data link layer functions on the data e.g., packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, sequence number, error correction code, etc.). An example of error correction code is cyclic redundancy check (CRC). In one example, the clock generator 268 may generate a clock based on the EP reference clock through a differential clock line 288, and input the clock to the PCIe controller 262 to control time operations of the PCIe controller 262.

The PHY TX block 266 serializes the parallel data from the PCIe controller 262 and drives the PCIe link 285 with the serialized data. In this regard, the PHY TX block 266 may include one or more serializers and one or more drivers. The clock generator 268 may generate a high-frequency clock for the one or more serializers based on the EP reference clock signal.

At the host system 210, the PHY RX block 226 receives the serialized data via the PCIe link 285, and deserializes the received data into parallel data. In this regard, the PHY RX block 226 may include one or more receivers and one or more deserializers. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

The communication mechanism between PCIe devices (e.g., a host 210 and an endpoint 250) involves three layers: a transaction layer, a data link layer, and a physical layer. A data packet processed at the transaction layer can be referred to herein as a transaction layer packet (TLP). A flow control mechanism can be used to control the transmission and retransmission of TLPs between PCIe devices, which can be referred to as link partners in this disclosure. At a transmitter (e.g., a transmitting link partner), a sequence number is added to each TLP's header transmitted. Also, an error checker (e.g., a CRC) is added to each TLP. At a receiver (e.g., a receiving link partner), TLPs are accepted and processed in an order according to their sequence number order. A TLP with an earlier sequence number is processed at the transaction layer before a TLP with a later sequence number can be presented to the transaction layer for processing. In the current PCIe implementation, if the sequence number of a received TLP is not the expected or anticipated sequence number, the TLP is discarded, and the receiver waits for another TLP with the expected sequence number. If the TLP has the correct sequence number, the receiver can present the TLP to the transaction layer for processing. Therefore, frequent retransmission of TLPs can result in reduced throughput and increased power consumption. Further, current PCIe flow control implementations unnecessarily retransmit valid TLPs that passed CRC check but are out of sequence. As such, the PCIe link and the link partners cannot enter into a deep power saving state.

Figure 3:
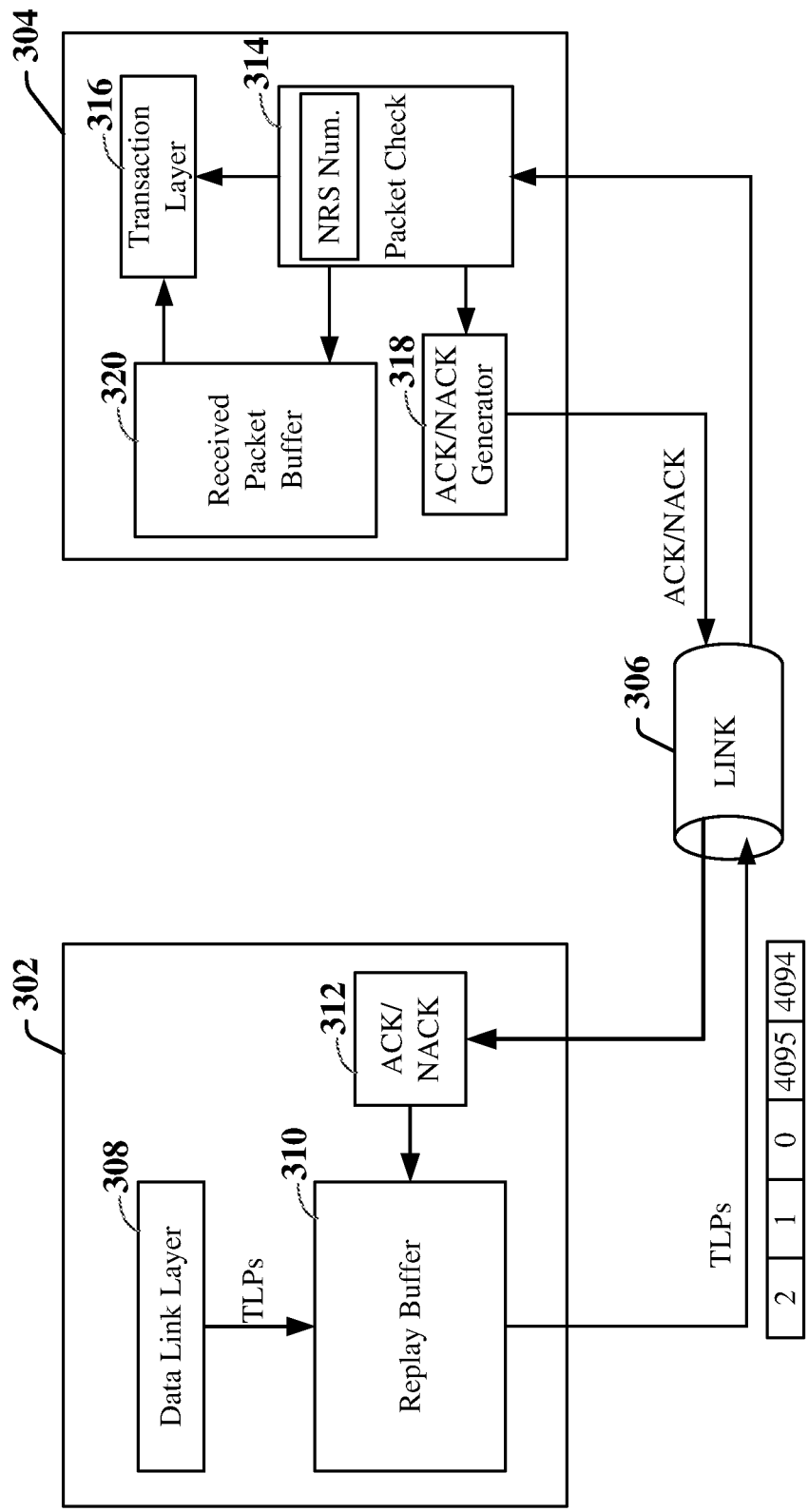
FIG. 3 is a block diagram conceptually illustrating exemplary flow control of transaction layer packets (TLPs) between link partners according to some aspects of the present disclosure.

FIG. 3 is a block diagram conceptually illustrating flow control of data packets (e.g., TLPs) between PCIe link partners according to some aspects. The link partners may include a transmitter 302 and a receiver 304. In one example, the transmitter 302 and the receiver 304 may be implemented as the host system 210 and endpoint device 250 of FIG. 2. The transmitter 302 can transmit one or more TLPs to the receiver 304 through a PCIe link 306. At the transmitter, a data link layer 308 can provide the TLPs to a replay buffer 310, from which the TLPs can be transmitted to the receiver 304 via the PCIe link 306. Each TLP has a sequence number, for example, between 0 and 4095. In some aspects, the sequence number 0 may be reserved for other flow control purposes that will be described below in more detail. For example, the sequence number increments for each TLP transmitted. When the sequence number reaches 4095, the sequence number rolls over to 1 and continues incrementing again.

The replay buffer 310 can store a copy of each transmitted TLP for which a feedback has not yet been received from the receiver 304. In one example, the replay buffer 310 may store copies of TLPs with sequence numbers 4094, 4095, 0, 1, and 2 that have been transmitted to the receiver 304 via the link 306. In this case, sequence number 4094 is the earliest, and the sequence number 2 is the last in this sequence. When a TLP is received by the receiver 304, the packet is checked for error (e.g., CRC check), for example, using a packet check block 314. The receiver also checks the sequence number of the TLP, for example, using the packet check block 314 that may maintain a next receive sequence (NRS) number. The NRS number indicates the anticipated sequence number of the next TLP to be received. For example, the last correctly received TLP has a sequence number equal to NRS−1. For example, after the receiver has correctly received the TLP with the sequence number 4094, the NRS number is 4095. The receiver can increment the NRS after each successful reception of TLP.

When the receiver 304 receives a valid TLP (e.g., CRC check passed) with a correct sequence number, the receiver can process the TLP, for example, at its transaction layer 316. Also, the receiver can schedule an acknowledgment (ACK) for the TLP to be sent to the transmitter 302. For example, the receiver can schedule the ACK using an ACK/NACK generator 318. The ACK can indicate the sequence number of the TLP that is being acknowledged. When the transmitter 302 receives the ACK, the transmitter can check the sequence number associated with the ACK, for example, using an ACK/NACK block 312. Then, the transmitter can purge the replay buffer 310 to remove the copies of the TLPs having sequence numbers less than or equal to the ACK'ed sequence number.

When the receiver 304 receives a valid TLP (i.e., CRC check passed) but with an invalid sequence number (i.e., greater than to the NRS number or expected sequence number), the receiver can store the valid TLP in a received packet buffer (RPB) 320 for later processing, instead of discarding the valid TLP. The receiver 304 can store multiple out-of-order valid TLPs in the RPB 320. In some aspects, the receiver 304 can send a NACK with parameters to enable the transmitter 302 to selectively retransmit (replay) only those TLP(s) that were not successfully received (e.g., corrupted or missing in transmission), instead of retransmitting (re-playing) all the packets stored in the replay buffer 310. For example, the NACK may include a starting sequence number (SSN) (a first parameter) and an ending sequence number (ESN) (a second parameter), to indicate a range of packets for which retransmission or replay is needed. For example, after receiving the NACK, the transmitter 302 retransmits all the TLP(s) in the replay buffer with a sequence number between SSN+1 and ESN (both inclusive). Further, the transmitter 302 purges the replay buffer 310 of all TLP(s) with sequence numbers that are equal to or less than the SSN.

In some aspects, the RPB 320 may be implemented as a sorted array in ascending or descending order of sequence numbers. A new TLP can be added to the array using an insertion sort technique to maintain the proper order of TLPs in the array based on their sequence numbers. In some aspects, the RPB 320 may be implemented as a hashed array. A new TLP can be added to the array at the index location that corresponds to the sequence number of the TLP. In some aspects, a preselected sequence number (e.g., sequence number 0) can be reserved to notify a transmitter that the RPB is empty. In one example, numbers 1 to 4095 can be used as TLP sequence numbers. For example, when ESN is set to 0 in a NACK, this NACK indicates that the RPB 320 is empty.

Figure 4:
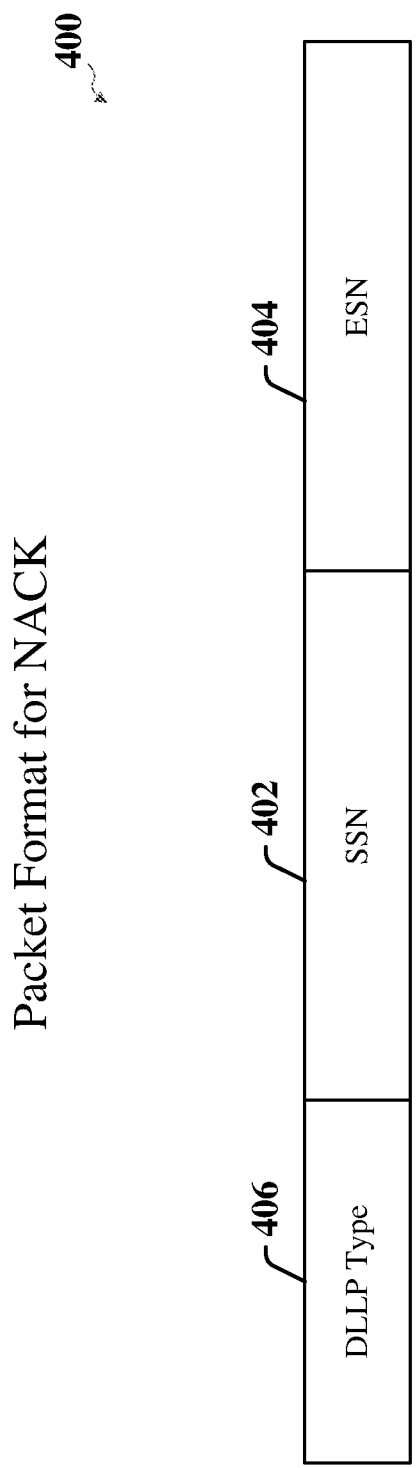
FIG. 4 is a drawing illustrating a negative acknowledgment packet (NACK) format according to some aspects of the present disclosure.

FIG. 4 is a drawing illustrating a NACK packet format 400 that can be used to implement the NACK described above. The NACK 400 includes an SSN field 402 and an ESN field 404 to indicate the SSN and ESN that can be used by the transmitter 302 to select the TLP(s) stored in the replay buffer 310 for retransmission. The NACK packet can further include a header 406 (e.g., 8-bit header) that indicates the packet type. The SSN field and ESN field may be 12-bits long each. In some aspects, the NACK packet may be a data link layer packet (DLLP). In some aspects, the SSN 402 may correspond to reserved bits (e.g., 12 reserved bits) in the DLLP according to the PCIe specification.

Figure 5:
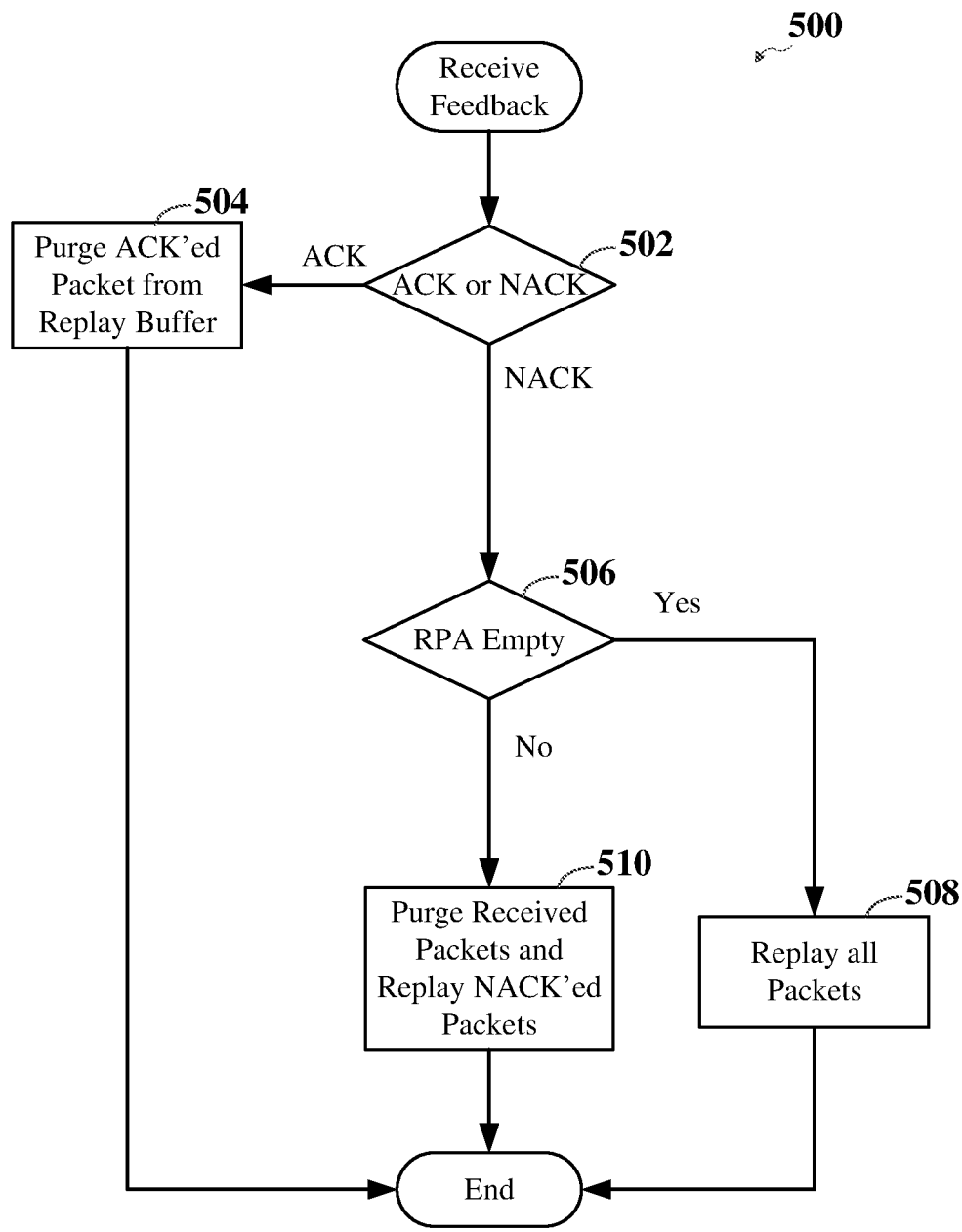
FIG. 5 is a flow chart illustrating a process of selectively retransmitting TLPs at a transmitter according to some aspects of the present disclosure.

FIG. 5 is a flow chart illustrating a process 500 of selectively retransmitting TLPs at a transmitter according to some aspects. In one example, the process 500 can be implemented at any PCIe device (e.g., the transmitter 302) described herein. After receiving a feedback from a link partner, at 502, a transmitter can check whether or not the feedback is an ACK or NACK for TLP(s) previously sent to the link partner (e.g., receiver 304). At 504, when the feedback is an ACK, the transmitter can purge its replay buffer of one or more TLPs with a sequence number that is equal to or earlier than a sequence number indicated by the ACK. For example, the ACK may include the SSN.

At 506, when the feedback is a NACK, the transmitter determines whether or not the received packet buffer (RPB) (e.g., RPB 320) of the receiver is empty based on the SSN and ESN included in the NACK. For example, a preselected value (e.g., ESN=0) of ESN can indicate that the RPB of the receiver is empty. At 508, when the NACK indicates that the RPB of the receiver is empty, the transmitter can retransmit (replay) all TPL(s) stored in its replay buffer (e.g., replay buffer 310). At 510, when the NACK indicates that the RPB is not empty (i.e., contains one or more TLPs), the transmitter can retransmit TLPs and/or purge TLPs from the replay buffer based on the SSN and ESN provided by the NACK. For example, the transmitter purges TLPs with sequence numbers that are earlier than or equal to SSN, and retransmits any TLP with a sequence number that is later than the SSN and equal to or earlier than the ESN.

Figure 6:
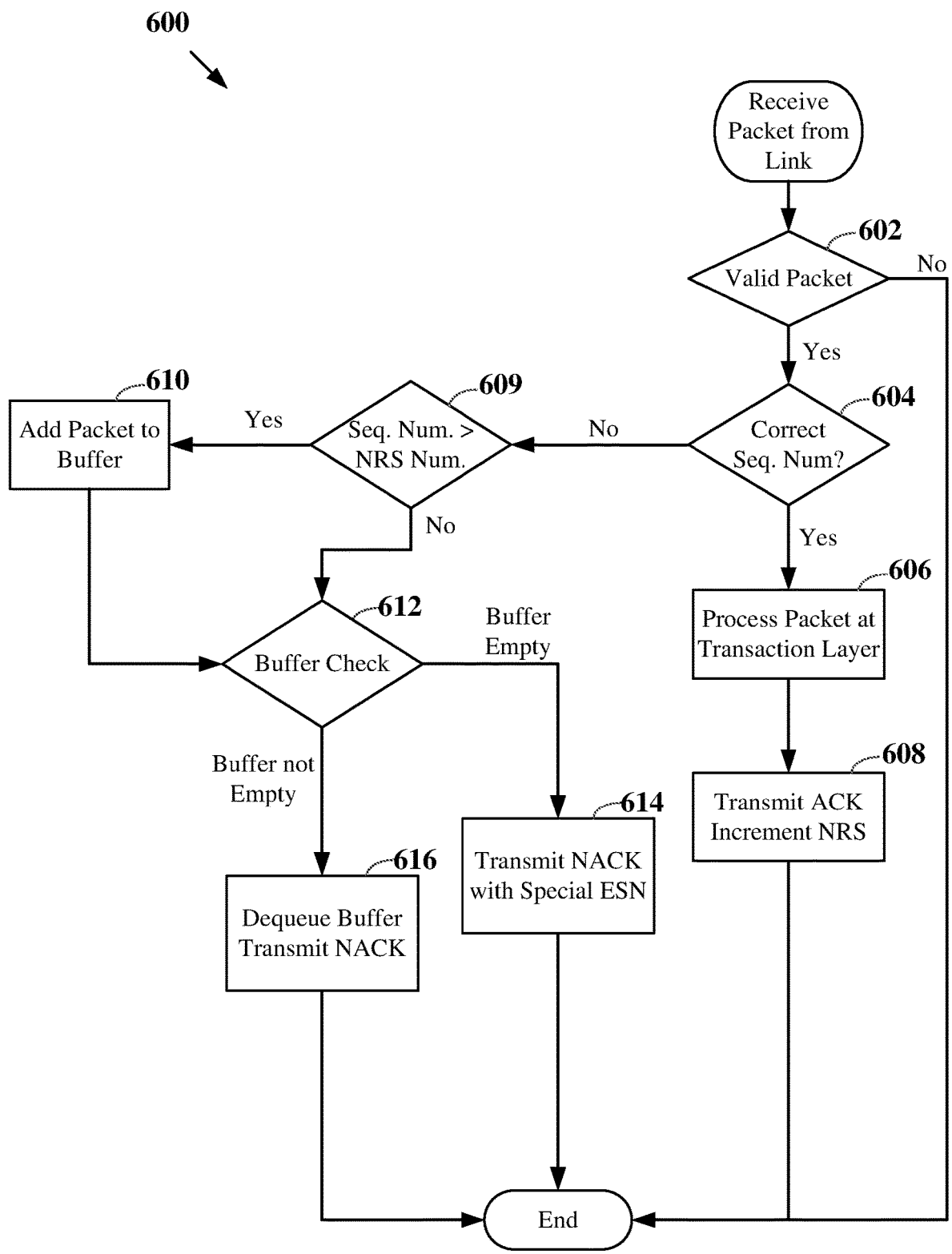
FIG. 6 is a flow chart illustrating a process of receiving TLPs at a receiver according to some aspects of the present disclosure.

FIG. 6 is a flow chart illustrating a process 600 of receiving TLPs at a receiver according to some aspects. In one example, the process 600 can be implemented at any PCIe device (e.g., the receiver 304) described herein. After receiving a TLP from a link partner, at 602, the receiver determines whether or not the packet is valid (i.e., CRC check passed). At 604, the receiver determines whether or not the TLP has the correct or anticipated sequence number, for example, the NRS number maintained at the packet check block 314 of the receiver. For example, if the TLP has a sequence number later than the NRS, it indicates that the TLP is out of sequence.

At 606, when the received TLP is valid and has the correct sequence number, the receiver can process the TLP at the transaction layer. At 608, the receiver can schedule an ACK to be transmitted with the sequence number of the TLP. Then, the receiver can increment the NRS number for the next anticipated TLP. For example, the receiver can increment the NRS number maintained at the packet check block 314.

At 609, the receiver determines whether or not the sequence number of the received TLP is later than the NRS number. At 610, when the received TLP is valid and has a sequence number later than the anticipated sequence number, the receiver can add the received TLP to a buffer instead of discarding the out-of-order TLP. In one example, the buffer may be the RPB 320 that can store TLPs in a sorted array of their sequence numbers or at index locations that correspond to the sequence numbers of TLPs. Keeping the out-of-order but valid TLPs at the buffer can reduce unnecessary retransmission of these TLPs.

At 612, the receiver checks the buffer status. At 614, when the buffer (e.g., RPB 320) is empty, the receiver can transmit a NACK with a special ESN (e.g., a value of 0) that indicates that the buffer is empty. In response, the transmitter can retransmit all TLP(s) stored in the replay buffer 310. At 616, when the buffer (e.g., RPB 320) is not empty, the receiver can dequeue the buffer to process one or more TLPs in sequence at the transaction layer if the buffer contains a TLP (e.g., TLP with the latest sequence number or index value in the buffer) with the correct anticipated sequence number. For each TLP dequeued from the buffer, the receiver increments the NRS number. The receiver repeats the dequeue process until no more TLPs are available to be processed at the transaction layer.

When none of the TLP(s) in the buffer has the correct sequence number (i.e., NRS number), the receiver can transmit a NACK that includes information for facilitating packet retransmission at the transmitter. For example, the NACK may include the SSN and the ESN as described above to request the transmitter to resend the missing or corrupted packets.

Figure 7:
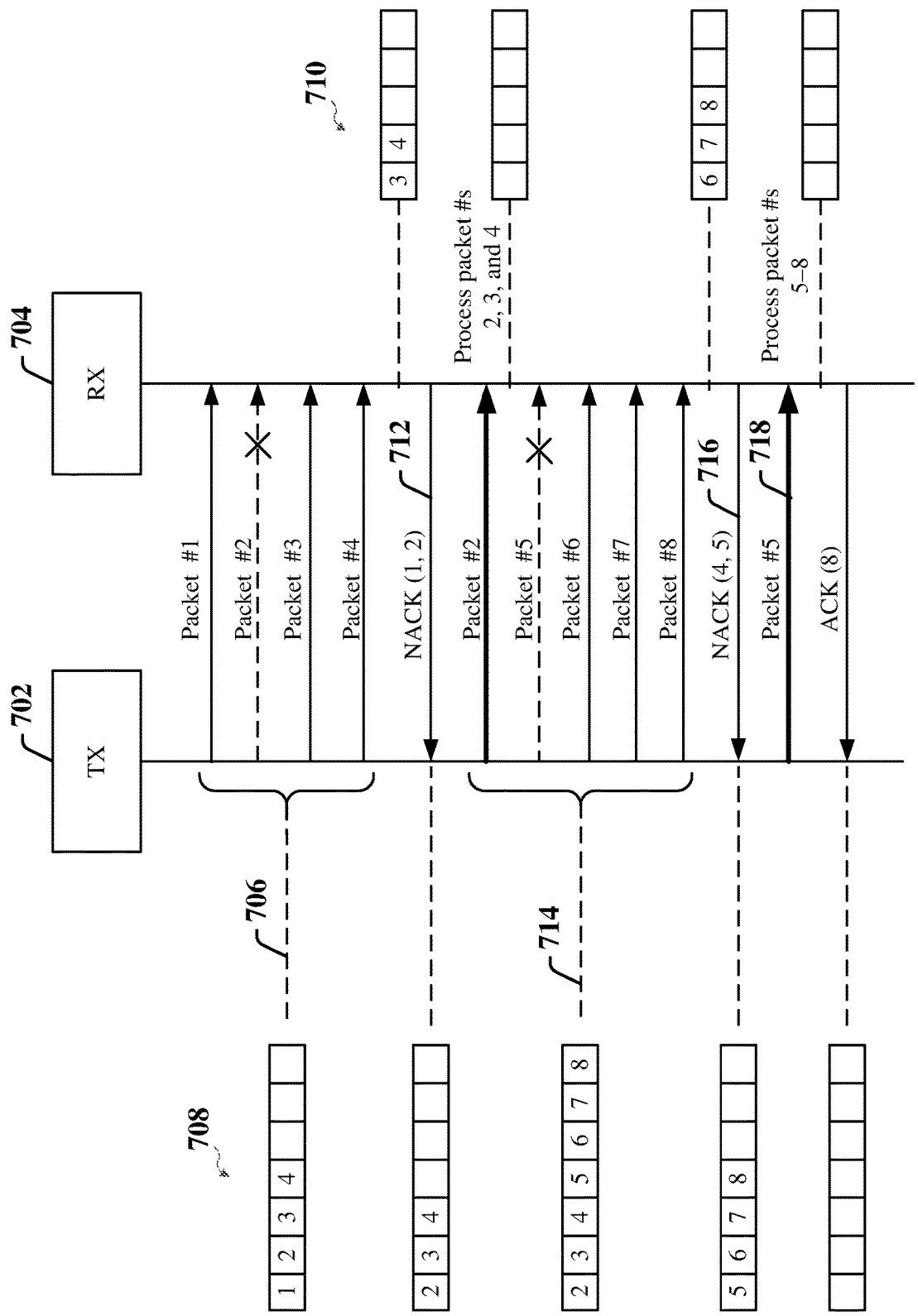
FIG. 7 is a diagram illustrating an example of selective TLP retransmissions according to some aspects of the present disclosure.

FIG. 7 is a diagram illustrating an example of selective TLP retransmissions according to some aspects. In one example, a transmitter 702 is configured to transmit a number of TLPs to a receiver 704. The transmitter 702 and receiver 704 may be any of the PCIe devices described herein, for example, the transmitter 302 and receiver 304. At 706, the transmitter transmits four packets (e.g., TLPs) to the receiver. The transmitter can store copies of the transmitted packets #1 to #4 in a replay buffer 708 (e.g., replay buffer 310). In this case, the receiver successfully receives packets #1, #3, and #4, but fails to receive packet #2. The receiver processes packet #1 at the transaction layer, but stores packets #3 and #4 in a received packet buffer 710 (e.g., RPB 320) because packets #3 and #4 are not the anticipated packet #2. Then, at 712, the receiver sends a NACK (1, 2) to request the transmitter to retransmit packet #2 and indicate that the transmitter can purge packet #1 and earlier packets (if any) stored in the replay buffer 708.

At 714, the transmitter retransmits packet #2, and the receiver successfully receives packet #2. After receiving packet #2, the receiver can process packets #2, #3, and #4, which are stored in the received packet buffer 710. At this point, the received packet buffer 710 is dequeued and becomes empty. In the meantime, the transmitter can transmit packets #5, #6, #7, and #8 to the receiver. In this case, the receiver fails to receive packet #5 but correctly receives packets #6, #7, and #8. Thus, the receiver can store packets #6, #7, and #8 in the received packet buffer 710 for later processing.

At 716, the receiver sends a NACK (4,5) to request the transmitter to retransmit packet #5 and indicate that the transmitter can purge packet #4 and earlier packets (if any) stored in the replay buffer 708. In response, the transmitter deletes copies of packets #2, #3, and #4 in the replay buffer 708. At 718, the transmitter retransmits packet #5. This time, the receiver correctly receives packet #5, and processes packets #5, #6, #7, and #8 at the transaction layer. At this point, the received packet buffer 710 is dequeued and becomes empty. Then, the receiver transmits an ACK (8) to the transmitter. After receiving the ACK (8), the transmitter can purge any packet with a sequence number equal to or earlier than #8 (e.g., packets #5, #6, #7, and #8) in the replay buffer 708.

In the example shown in FIG. 7, the transmitter transmits eight packets (packet #s 1-8) to the receiver. With two packets lost (packets #2 and #5), the transmitter needs to transmit 10 packets including 2 retransmissions using the selective retransmission techniques described above in relation to FIGS. 3-6. In contrast, the current PCIe implementation would cause the transmitter to transmit 15 packets including 7 retransmissions. For example, according to the current PCIe implementation, the transmitter can retransmit packets #2, #3, and #4 after receiving a NACK of packet #2, and retransmit packets #5 to #8 after receiving a NACK for packet #5. In this case, more packets are retransmitted than using the techniques of the present disclosure.

Figure 8:
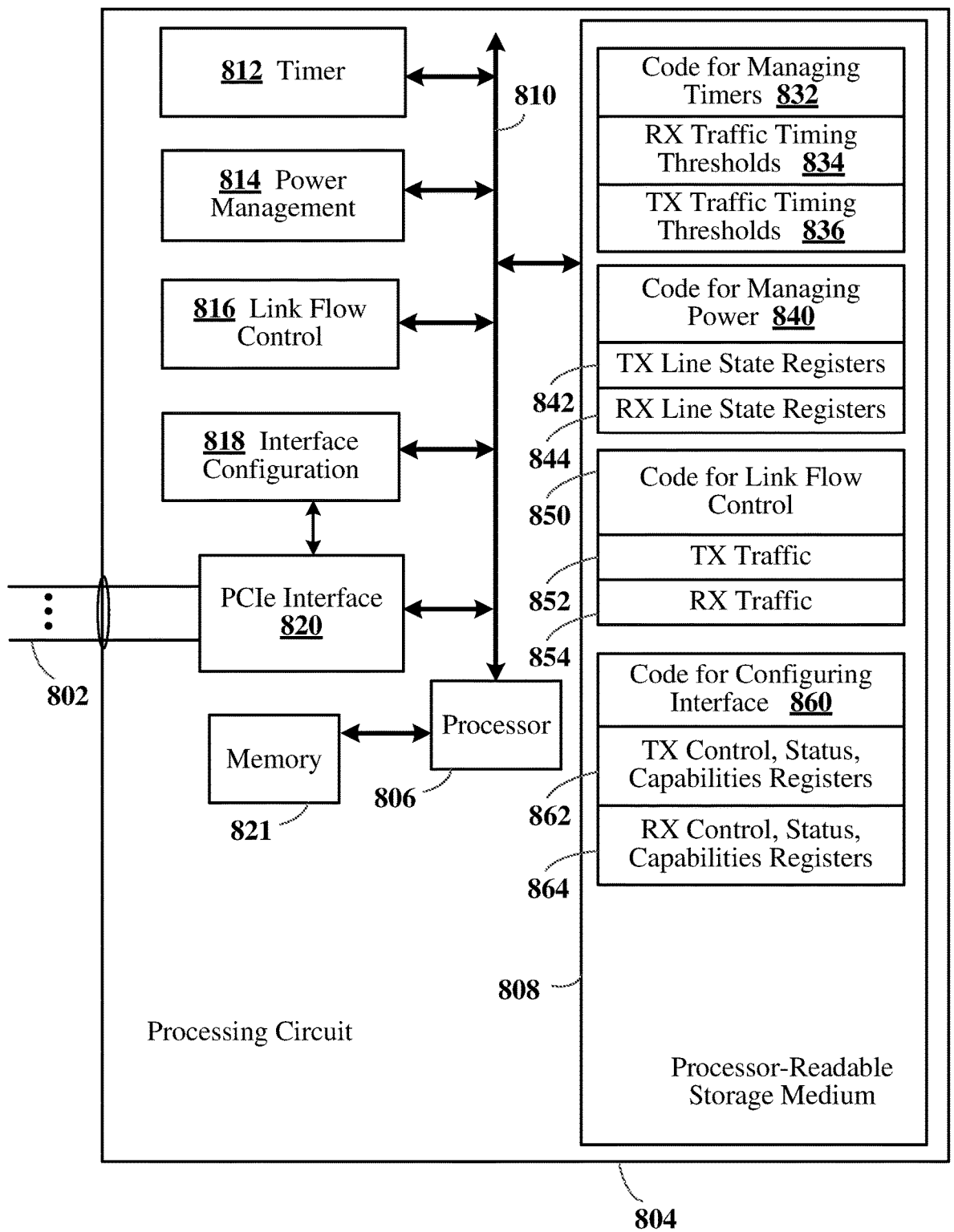
FIG. 8 is a block diagram of a PCIe link interface processing circuit according to aspects of the present disclosure.

FIG. 8 is a block diagram of a link interface processing circuit. The processing circuit 804 is an apparatus that may be a part of a host or an endpoint. It is coupled to a link 802, e.g., a PCIe link, with multiple duplex lanes similar to those described in relation to FIGS. 5-7. The link 802 can be coupled at an opposite end to another PCIe device (e.g., an endpoint or a host). Data and control information communicated as packets through the link 802 are coupled to a link interface 820 (e.g., PCIe interface) which provides a PHY level interface to the link 802 and converts baseband signals to packets. The data and control packets are sent through the link interface 820 through a bus 810 to other components of the processing circuit 804. The link interface 820 has a direct connection to interface configuration circuitry 818 for configuration and control settings for the operation of the link 802.

The processing circuit 804 further include a memory 821 that can be used for storing data and information used by the processor during various operation. In some aspects, the memory 821 can store information and data packets used for flow control of TLPs. In one example, the memory 821 can provide a buffer (e.g., replay buffer 310) used for storing copies of transmitted TLPs. In one example, the memory 821 can provide a buffer (e.g., a received packet buffer 320) used for storing received TLPs.

The processing circuit 804 further includes timer circuitry 812 that is coupled to the bus 810. The timer circuitry 812 can be configured for various timing-related functions, for example, timing for latency, inactivity, acknowledgment, and flow control. The timer circuitry 812 can access a computer-readable storage medium 808 to access code for managing timers 832. In some aspects, the storage medium is a non-transitory computer-readable medium. The timer circuitry 812 may also access registers maintained in the storage medium 808 (and/or memory 821) that contain receive (RX) traffic timing thresholds 834 and transmit (TX) traffic timing thresholds 836, which can be used during flow control of TLPs.

The processing circuit 804 can further include power management circuitry 814 that manages power to each line/lane of the link 802 and to other components of the processing circuit 804. The power management circuitry 814 has access through the bus 810 to code for managing PCIe power 840 and to transmit line state registers 842 and receive line state registers 844. These registers may be used to store a state for each transmit line and each receive line, or for a transmit side of a link and a receive side of the link. The state may be determined using the code for managing timers 832, the code for managing PCIe power 840, or in another way.

The processing circuit 804 can further include link flow control circuitry 816 that monitors and provides flow control for the traffic (e.g., TLPs) on the link 802. For example, the link flow control circuitry 816 can monitor transmitted TLPs and/or received TLPs to provide flow control of the link. In one example, the link flow control circuitry can generate ACK/NACK of the TLPs. The link flow control circuitry 816 has access to code for link flow control 850 in the storage medium 808 and also to registers to store results and to obtain traffic activity information used for link flow control. For example, transmit traffic activity 852 and receive traffic activity 854 can be used for monitoring transmit traffic activity and receive traffic activity, respectively.

The power management circuitry 814 may manage power of the transmit lines and power of the receive lines in accordance with the transmit traffic activity and the receive traffic activity. The interface configuration circuitry 818 may modify the configuration in response to the power management circuitry 814. For example, the interface configuration circuitry 818 can change the link state of the link 802.

The interface configuration circuitry 818 is coupled to the bus 810 as are the link flow control circuitry 816, power management circuitry 814, and the timer circuitry 812 so that each of these blocks may communicate with each other, with the storage medium 808 and to a processor 806. The processor 806 can control the operation of the other components and instigates instances of each component or its function as appropriate to the operation of the processing circuit 804. The interface configuration circuitry 818 also has access to code for configuring the PCIe interface 860. On executing this code, the interface configuration circuitry 818 can read and write values from a variety of configuration registers. For example, these registers include TX control, status, and capabilities registers 862 and RX control, status, and capabilities registers 864. These registers may be accessed and read at the start of link initialization and then updated with the result of the initialization. The registers may also be modified in response to power management and bandwidth negotiations or to change the status of one or more transmit lines or receive lines of the link 802.

The processing circuit 804 may initialize the link 802, manage the power, link state, and change the number of active lines of the link 802. In operation, bandwidth requests may also be received from the host or endpoint. Bandwidth requests may cause a bandwidth negotiation followed by a change in values set to control, status, and capabilities registers. The number of active lines may then be changed in response to transmit traffic activity and receive traffic activity. The link flow control circuitry 816 also can monitor TX traffic activity for the transmit lines of the link 802 and monitors RX traffic activity for the receive lines of the link 802. The TX traffic activity and RX traffic activity are evaluated to determine a change of the number of active lines. The Power management circuitry 814 may change the link state of one or more TX or RX lines. The state change may then be recorded in TX line state registers 842 and RX line state registers 844. The evaluation may be performed in different ways. In some examples, the TX traffic activity is compared to one or more thresholds in TX traffic registers 852 and the RX traffic activity is compared to one or more thresholds in RX traffic registers 854 at the link flow control circuitry 816. A message may then be sent to the connected device (e.g., the host or endpoint) through the link 802.

Upon changing the number of active lines or link state, the power management 814 may change the voltage levels of one or more of the voltages 276, 278, and 280 by instructing the PMIC 290 to set the voltage levels of one or more of the voltages supplied by the PMIC 290 as shown in FIG. 2. The power management circuitry 814 may also connect or disconnect power to drivers and receivers of affected lines in accordance with a new number of active lines. As an example, if the number of active lines is decreased, then the power management circuitry 814 may power down the drivers in the PHY TX block 222 and/or the receivers in the PHY RX block 226 corresponding to the lines in the link 802 that are being deactivated because of the change. The power management circuitry 814 may power down selected drivers and/or receivers by sending instructions to a power switch circuit to turn off the selected drivers and/or receivers. So a power according to the negotiated bandwidth is managed by supplying one or more voltages to the interface circuit of the link and by setting the levels of the one or more voltages.

Figure 9:
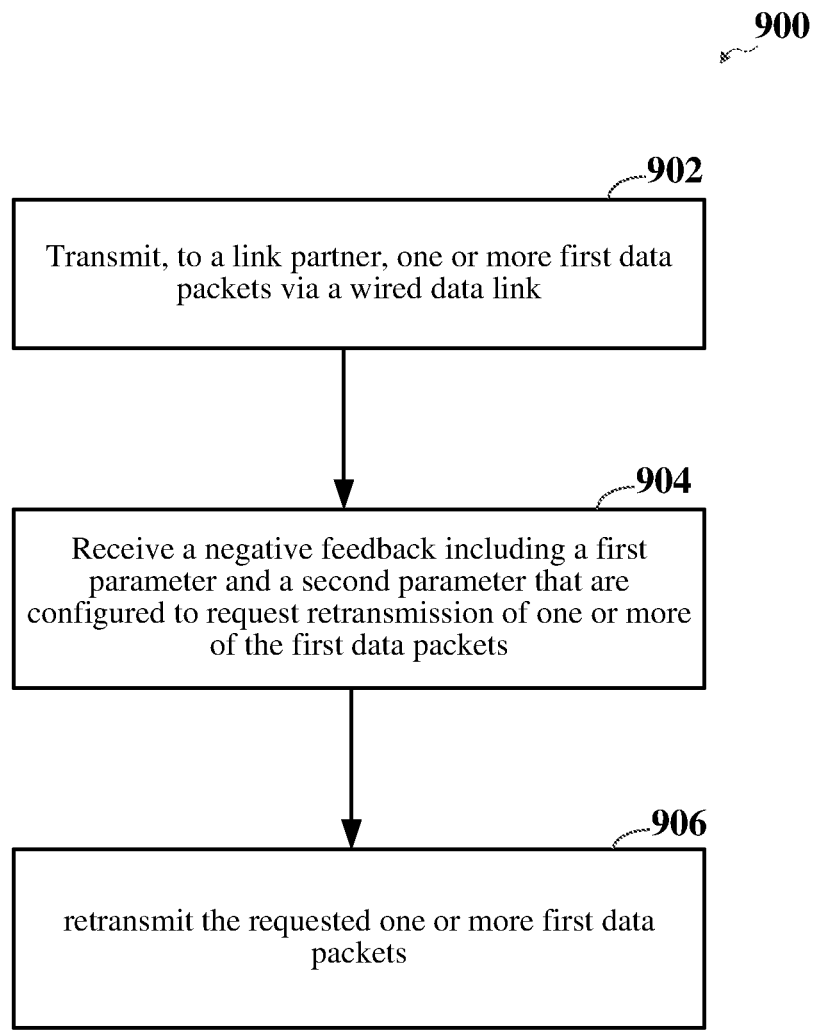
FIG. 9 is a flow diagram of a first exemplary method for flow control of a communication link according to aspects of the present disclosure.

FIG. 9 illustrates a flow diagram of a method 900 for flow control of a wired data link, e.g., a PCIe link, according to aspects of the present disclosure. In certain aspects, the method 900 provides techniques for flow control of a wired data link. As described herein the wired data link can be a PCIe link, however, the method may be adapted to suit other data links using flow control.

At 902, the method includes a process of transmitting (to a link partner, e.g., a host or an endpoint) one or more first data packets via a wired data link (e.g., PCIe link). In one aspect, the PCIe interface 820 can provide a means to transmit one or more first data packets using the wired data link. For example, the one or more first data packets may be the data packets #1, #2, #3, and #4 of FIG. 7. Each of the data packets has a sequence number for facilitating flow control and reordering of the data packets at the receiver. In one aspect, the link flow control circuitry 816 may be a means to provide flow control related functions for a wired data link (e.g., PCIe link). In some aspects, the apparatus can store copies of the transmitted first data packets in a buffer (e.g., the replay buffer 310) that may be implemented using the memory 821 and/or storage medium 808 of FIG. 8.

At 904, the method includes a process of receiving a negative feedback including a first parameter and a second parameter that are configured to request retransmission of one or more of the first data packets. For example, one or more of the first data packets may be corrupted or missing such that the apparatus can request retransmission of these data packets. In one aspect, the PCIe interface 820 can provide a means to receive the negative feedback from the link partner. In some aspects, the negative feedback may be a NACK (e.g., NACK 712, 716) as described above in relation to FIGS. 3-7. In one example, the negative feedback may be the NACK 400 of FIG. 4 that includes a first parameter (e.g., SSN 402) and a second parameter (e.g., ESN 404). In one aspect, the link flow control circuitry 816 can provide a means to process the negative feedback (e.g., NACK) to determine the requested data packets for retransmission. For example, the negative feedback can be NACK (1, 2) that requests the retransmission of data packet #2, but not data packets #3 and #4 because these packets are already stored in the received packet buffer 320.

At 906, the method includes a process of retransmitting the requested one or more first data packets. In one aspect, the PCIe interface 820 can provide a means to retransmit the requested first data packets. In one aspect, the link flow control circuitry 816 can provide the requested data packets for retransmission to the PCIe interface 820. For example, the link flow control circuitry 816 can retrieve copies of the retransmitted data packets in a replay buffer maintained in the memory 821 and/or storage medium 808. For example, the method can retransmit the data packet #2 but skip data packets #3 and #4. Then, the method can transmit data packets #5, #6, and so on.

Figure 10:
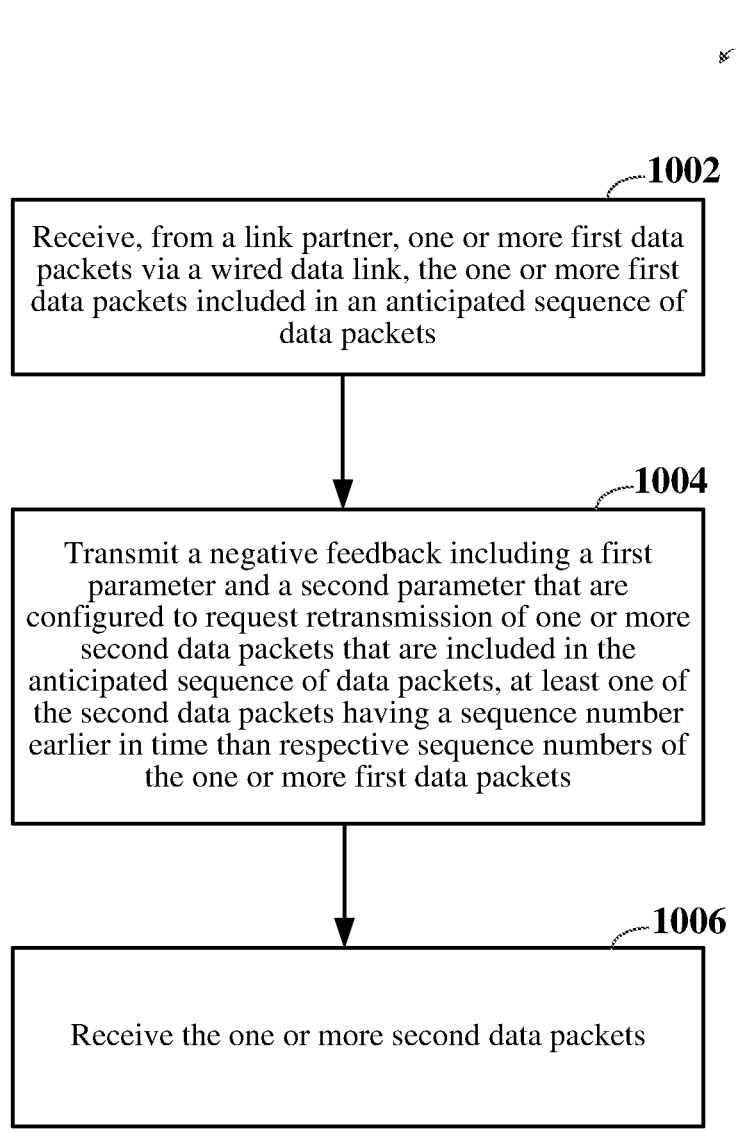
FIG. 10 is a flow diagram of a second exemplary method for flow control of a communication link according to aspects of the present disclosure.

FIG. 10 illustrates a flow diagram of a method 1000 for flow control of a wired data link, e.g., a PCIe link, according to aspects of the present disclosure. In certain aspects, the method 1000 provides techniques for flow control of a wired data link. As described herein the data link can be a PCIe link, however, the method may be adapted to suit other data links using flow control.

At 1002, the method includes a process of receiving from a link partner (e.g., host or endpoint) one or more first data packets via a wired data link (e.g., PCIe link). The one or more first data packets are included in an anticipated sequence of data packets. In one aspect, the PCIe interface 820 can provide a means to receive one or more first data packets using the PCIe link. For example, the one or more first data packets may be the data packets #1, #2, #3, and #4 of FIG. 7. Each of the data packets has a sequence number for facilitating flow control and reordering of the data packets. In one aspect, the link flow control circuitry 816 may provide a means to provide flow control related functions of the data packets. In some aspects, the apparatus can store copies of the received first data packets in a received packet buffer 320 (e.g., implemented using the memory 821 and/or storage medium 808 of FIG. 8). The received data packets can be valid (e.g., CRC check passed) but do not have the correct sequence numbers for future processing at the transaction layer. For example, the received valid data packet may have a sequence number that is later in time (e.g., greater) than the anticipated sequence number.

At 1004, the method includes a process of transmitting a negative feedback including a first parameter and a second parameter that are configured to request retransmission of one or more second data packets that are included in the anticipated sequence of data packets. For example, at least one of the second data packets has a sequence number earlier in time (e.g., greater) than the sequence numbers of the one or more first data packets. At least one of the second data packets may have a sequence number equal to the anticipated sequence number. In one aspect, the PCIe interface 820 can provide a means to transmit the negative feedback using the PCIe link 802. In some aspects, the negative feedback may be a NACK as described above in relation to FIGS. 3-7. In one example, the negative feedback may be a NACK 400 of FIG. 4 that includes a first parameter (e.g., SSN 402) and a second parameter (e.g., ESN 404). In one aspect, the link flow control circuitry 816 can provide a means to generate the negative feedback (e.g., NACK) based on the sequence numbers of the received first data packets and an anticipated sequence number that indicates the next data packet to be received in the correct sequence number order for transaction layer processing.

At 1006, the method includes a process of receiving the one or more second data packets. In one aspect, the PCIe interface 820 can provide a means to receive the second data packets from the PCIe link 802. In one aspect, the link flow control circuitry 816 can process the received second data packets based on the sequence numbers of the data packets. In one example, the link flow control circuitry 816 can store the second data packets at the received packet buffer 320 (e.g., implemented using the memory 821 and/or storage medium 808 of FIG. 8). In one example, the link flow control circuitry 816 can process the received and/or second data packets at the transaction layer based on their respective sequence numbers if at least one of the second data packets has a sequence number equal to the anticipated sequence number.

The following provides an overview of examples of the present disclosure.

Example 1: A method of operating an apparatus for data communication, comprising: transmitting, to a link partner, one or more first data packets via a wired data link; receiving a negative feedback comprising a first parameter and a second parameter that are configured to request retransmission of one or more of the first data packets; and retransmitting the requested one or more first data packets.

Example 2: The method of example 1, further comprising: transmitting a second data packet after the retransmission of the requested one or more first data packets, wherein a sequence number of the second data packet is out-of-order with respect to respective sequence numbers of the retransmitted one or more first data packets.

Example 3: The method of example 1, further comprising: storing the one or more first data packets in a replay buffer, and after receiving the negative feedback, purging one or more of the stored first data packets from the replay buffer, indicated by the first parameter.

Example 4: The method of example 3, wherein the retransmitting the requested one or more first data packets comprises: retransmitting one or more of the first data packets stored in the replay buffer determined based on the first parameter and the second parameter.

Example 5: The method of example 1, 2, 3, or 4, wherein the first parameter of the negative feedback is configured to indicate successful transmission of one or more of the first data packets, each first data packet having a sequence number that is earlier in time than or equal to a sequence number indicated by the first parameter.

Example 6: The method of example 1, 2, 3, or 4, wherein the first parameter comprises a first sequence number, and the second parameter comprises a second sequence number that is later in time than the first sequence number, and wherein each of the retransmitted first data packets comprises a sequence number that is later in time than the first sequence number and earlier in time than or equal to the second sequence number.

Example 7: The method of example 1, 2, 3, or 4, wherein the second parameter comprises a value reserved to indicate that a receive buffer of the link partner is empty.

Example 8: The method of example 1, 2, 3, or 4, wherein the wired data link comprises a peripheral component interconnect express (PCIe) link.

Example 9: A method of operating an apparatus for data communication, comprising: receiving, from a link partner, one or more first data packets via a wired data link, the one or more first data packets included in an anticipated sequence of data packets; transmitting a negative feedback comprising a first parameter and a second parameter that are configured to request retransmission of one or more second data packets that are included in the anticipated sequence of data packets, at least one of the second data packets having a sequence number earlier in time than respective sequence numbers of the one or more first data packets; and receiving retransmissions of the one or more second data packets.

Example 10: The method of example 9, further comprising: receiving a third data packet after receiving the one or more second data packets, wherein a sequence number of the third data packet is out-of-order with respect to respective sequence numbers of the one or more second data packets.

Example 11: The method of example 9, further comprising: storing the one or more first data packets in a receive buffer before processing the one or more first data packets at a transaction layer, wherein the respective sequence numbers of the one or more first data packets are later in time than an anticipated sequence number.

Example 12: The method of example 11, wherein the receive buffer is configured to store the one or more first data packets in an order according to the respective sequence numbers of the one or more first data packets.

Example 13: The method of example 11 or 12, further comprising: dequeuing one or more of the first data packets from the receive buffer in response to receiving the one or more second data packets; processing the dequeued one or more first data packets at the transaction layer; and processing the one or more second data packets at the transaction layer, after processing the one or more dequeued first data packets.

Example 14: The method of example 13, further comprising: incrementing the anticipated sequence number after dequeuing each first data packet, wherein each dequeued first data packet has a sequence number equal to the anticipated sequence number.

Example 15: The method of example 11 or 12, wherein the second parameter comprises a value reserved to indicate that the receive buffer is empty.

Example 16: The method of example 9, 10, 11, or 12, wherein: the first parameter comprises a first sequence number and the second parameter comprises a second sequence number that is earlier in time than the first sequence number; and the one or more second data packets have respective sequence numbers that are later in time than the first sequence number and earlier in time or equal to the second sequence number.

Example 17: The method of example 9, 10, 11, or 12 wherein the wired data link comprises a peripheral component interconnect express (PCIe) link.

Example 18: An apparatus for data communication, comprising: an interface circuit configured to provide an interface with a wired data link connected with a link partner; and a controller configured to: transmit, to the link partner, one or more first data packets via the wired data link; receive a negative feedback comprising a first parameter and a second parameter that are configured to request retransmission of one or more of the first data packets; and retransmit the requested one or more first data packets.

Example 19: The apparatus of example 18, wherein the controller is further configured to: transmit a second data packet after the retransmission of the requested one or more first data packets, wherein a sequence number of the second data packet is out-of-order with respect to respective sequence numbers of the retransmitted one or more first data packets.

Example 20: The apparatus of example 18, further comprising: a replay buffer, wherein the controller is further configured to: store the one or more first data packets in the replay buffer, and after receiving the negative feedback, purge one or more of the stored first data packets from the replay buffer, indicated by the first parameter.

Example 21: The apparatus of example 20, wherein, to retransmit the requested one or more first data packets, wherein the controller is further configured to: retransmit one or more of the first data packets stored in the replay buffer determined based on the first parameter and the second parameter.

Example 22: The apparatus of example 18, 19, 20, or 21, wherein the first parameter of the negative feedback is configured to indicate successful transmission of one or more of the first data packets, each first data packet having a sequence number that is earlier in time than or equal to a sequence number indicated by the first parameter.

Example 23: The apparatus of example 18, 19, 20, or 21, wherein the first parameter comprises a first sequence number, and the second parameter comprises a second sequence number that is later in time than the first sequence number, and wherein each of the retransmitted first data packets comprises a sequence number that is later in time than the first sequence number and earlier in time than or equal to the second sequence number.

Example 24: The apparatus of example 18, 19, 20, or 21, wherein the second parameter comprises a value reserved to indicate that a receive buffer of the link partner is empty.

Example 25: The apparatus of example 18, 19, 20, or 21, wherein the wired data link comprises a peripheral component interconnect express (PCIe) link.

Example 26: An apparatus for data communication, comprising: an interface circuit configured to provide an interface with a wired data link connected with a link partner; and a controller configured to: receive, from the link partner, one or more first data packets via the wired data link, the one or more first data packets included in an anticipated sequence of data packets; transmit a negative feedback comprising a first parameter and a second parameter that are configured to request retransmission of one or more second data packets that are included in the anticipated sequence of data packets, at least one of the second data packets having a sequence number earlier in time than respective sequence numbers of the one or more first data packets; and receive retransmissions of the one or more second data packets.

Example 27: The apparatus of example 26, wherein the controller is further configured to: receive a third data packet after receiving the one or more second data packets, wherein a sequence number of the third data packet is out-of-order with respect to respective sequence numbers of the one or more second data packets.

Example 28: The apparatus of example 26, wherein the controller is further configured to: store the one or more first data packets in a receive buffer before processing the one or more first data packets at a transaction layer, wherein the respective sequence numbers of the one or more first data packets are later in time than an anticipated sequence number.

Example 29: The apparatus of example 28, wherein the receive buffer is configured to store the one or more first data packets in an order according to the respective sequence numbers of the one or more first data packets.

Example 30: The apparatus of example 28 or 29, wherein the controller is further configured to: dequeue one or more of the first data packets from the receive buffer in response to receiving the one or more second data packets; process the dequeued one or more first data packets at the transaction layer; and process the one or more second data packets at the transaction layer, after processing the one or more dequeued first data packets.

Example 31: The apparatus of example 30, wherein the controller is further configured to: increment the anticipated sequence number after dequeuing each first data packet, wherein each dequeued first data packet has a sequence number equal to the anticipated sequence number.

Example 32: The apparatus of example 28 or 29, wherein the second parameter comprises a value reserved to indicate that the receive buffer is empty.

Example 33: The apparatus of example 26, 27, 28, or 29, wherein: the first parameter comprises a first sequence number and the second parameter comprises a second sequence number that is earlier in time than the first sequence number; and the one or more second data packets have respective sequence numbers that are later in time than the first sequence number and earlier in time or equal to the second sequence number.

Example 34: The apparatus of example 26, 27, 28, or 29, wherein the wired data link comprises a peripheral component interconnect express (PCIe) link.

It is to be appreciated that the present disclosure is not limited to the exemplary terms used above to describe aspects of the present disclosure. For example, bandwidth may also be referred to as throughput, data rate or another term.

Although aspects of the present disclosure are discussed above using the example of the PCIe standard, it is to be appreciated that present disclosure is not limited to this example, and may be used with other standards.

The host clients 214, the host controller 212, the device controller 252 and the device clients 254 discussed above may each be implemented with a controller or processor configured to perform the functions described herein by executing software including code for performing the functions. The software may be stored on a non-transitory computer-readable storage medium, e.g. a RAM, a ROM, an EEPROM, an optical disk, and/or a magnetic disk, shows as host system memory 240, endpoint system memory 274, or as another memory.

Any reference to an element herein using a designation e.g. "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method of operating an apparatus for data communication, comprising:
   transmitting, to a link partner, one or more first data packets via a wired data link;
   receiving a negative feedback comprising a first parameter and a second parameter that are configured to request retransmission of one or more of the first data packets; and
   retransmitting the requested one or more first data packets,
   wherein the first parameter comprises a first sequence number, and the second parameter comprises a second sequence number that is later in time than the first sequence number, and
   wherein one of the retransmitted one or more first data packets comprises a sequence number that is equal to the second sequence number.

2. The method of claim 1, further comprising:
   transmitting a second data packet after the retransmission of the requested one or more first data packets, wherein a sequence number of the second data packet is out-of-order with respect to respective sequence numbers of the retransmitted one or more first data packets.

3. The method of claim 1, further comprising:
   storing the one or more first data packets in a replay buffer, and
   after receiving the negative feedback, purging one or more of the stored first data packets from the replay buffer, indicated by the first parameter.

4. The method of claim 3, wherein the retransmitting the requested one or more first data packets comprises:
   retransmitting one or more of the first data packets stored in the replay buffer determined based on the first parameter and the second parameter.

5. The method of claim 1, wherein the first parameter of the negative feedback is configured to indicate successful transmission of one or more of the first data packets, each first data packet having a sequence number that is earlier in time than or equal to a sequence number indicated by the first parameter.

6. The method of claim 1, wherein the second parameter comprises a value reserved to indicate that a receive buffer of the link partner is empty.

7. The method of claim 1, wherein the wired data link comprises a peripheral component interconnect express (PCIe) link.

8. An apparatus for data communication, comprising:
   an interface circuit configured to provide an interface with a wired data link connected with a link partner; and
   a controller configured to:
   transmit, to the link partner, one or more first data packets via the wired data link;
   receive a negative feedback comprising a first parameter and a second parameter that are configured to request retransmission of one or more of the first data packets; and
   retransmit the requested one or more first data packets,
   wherein the first parameter comprises a first sequence number, and the second parameter comprises a second sequence number that is later in time than the first sequence number, and
   wherein one of the retransmitted one or more first data packets comprises a sequence number that is equal to the second sequence number.

9. The apparatus of claim 8, wherein the controller is further configured to:
   transmit a second data packet after the retransmission of the requested one or more first data packets, wherein a sequence number of the second data packet is out-of-order with respect to respective sequence numbers of the retransmitted one or more first data packets.

10. The apparatus of claim 8, further comprising:
    a replay buffer,
    wherein the controller is further configured to:
    store the one or more first data packets in the replay buffer;
    after receiving the negative feedback, purge one or more of the stored first data packets from the replay buffer, indicated by the first parameter; and
    retransmit one or more of the first data packets stored in the replay buffer determined based on the first parameter and the second parameter.

11. The apparatus of claim 8, wherein the first parameter of the negative feedback is configured to indicate successful transmission of one or more of the first data packets, each first data packet having a sequence number that is earlier in time than or equal to a sequence number indicated by the first parameter.

12. The apparatus of claim 8, wherein the second parameter comprises a value reserved to indicate that a receive buffer of the link partner is empty.

13. A method of operating an apparatus for data communication, comprising:
   receiving, from a link partner, one or more first data packets via a wired data link;
   transmitting a negative feedback comprising a first parameter and a second parameter that are configured to request retransmission of one or more of the first data packets; and
   receiving a retransmission of the requested one or more first data packets,
   wherein the first parameter comprises a first sequence number, and the second parameter comprises a second sequence number that is later in time than the first sequence number, and
   wherein one of the retransmitted one or more first data packets comprises a sequence number that is equal to the second sequence number.

14. The method of claim 13, further comprising:
   receiving a second data packet after the retransmission of the requested one or more first data packets, wherein a sequence number of the second data packet is out-of-order with respect to respective sequence numbers of the retransmitted one or more first data packets.

15. The method of claim 13, wherein the first parameter of the negative feedback is configured to indicate successful transmission of one or more of the first data packets, each first data packet having a sequence number that is earlier in time than or equal to a sequence number indicated by the first parameter.

16. The method of claim 13, wherein the second parameter comprises a value reserved to indicate that a receive buffer of the link partner is empty.

17. The method of claim 13, wherein the wired data link comprises a peripheral component interconnect express (PCIe) link.

18. An apparatus for data communication, comprising:
   an interface circuit configured to provide an interface with a wired data link connected with a link partner; and
   a controller configured to:
   receive, from the link partner, one or more first data packets via the wired data link;
   transmit a negative feedback comprising a first parameter and a second parameter that are configured to request retransmission of one or more of the first data packets; and
   receive a retransmission of the requested one or more first data packets,
   wherein the first parameter comprises a first sequence number, and the second parameter comprises a second sequence number that is later in time than the first sequence number, and
   wherein one of the retransmitted one or more first data packets comprises a sequence number that is equal to the second sequence number.

19. The apparatus of claim 18, wherein the controller is further configured to:
   receive a second data packet after the retransmission of the requested one or more first data packets, wherein a sequence number of the second data packet is out-of-order with respect to respective sequence numbers of the retransmitted one or more first data packets.

20. The apparatus of claim 18, wherein the first parameter of the negative feedback is configured to indicate successful transmission of one or more of the first data packets, each first data packet having a sequence number that is earlier in time than or equal to a sequence number indicated by the first parameter.

21. The apparatus of claim 18, wherein the second parameter comprises a value reserved to indicate that a receive buffer of the link partner is empty.

22. The apparatus of claim 18, wherein the wired data link comprises a peripheral component interconnect express (PCIe) link.

* * * * *